(12) United States Patent
Li et al.

(10) Patent No.: US 11,450,009 B2
(45) Date of Patent: Sep. 20, 2022

(54) OBJECT DETECTION WITH MODIFIED IMAGE BACKGROUND

(71) Applicant: Intel Corporation, Santa Clara, CA (US)

(72) Inventors: Yuming Li, Beijing (CN); Zhen Zhou, Shanghai (CN); Xiaodong Wang, Beijing (CN); Quan Yin, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,401

(22) PCT Filed: Feb. 26, 2018

(86) PCT No.: PCT/CN2018/077217
§ 371 (c)(1),
(2) Date: Jun. 24, 2020

(87) PCT Pub. No.: WO2019/161562
PCT Pub. Date: Aug. 29, 2019

(65) Prior Publication Data
US 2021/0217179 A1  Jul. 15, 2021

(51) Int. Cl.
*G06T 7/194* (2017.01)
*G06T 7/11* (2017.01)

(52) U.S. Cl.
CPC ............... *G06T 7/194* (2017.01); *G06T 7/11* (2017.01); *G06T 2207/20081* (2013.01); *G06T 2207/30236* (2013.01)

(58) Field of Classification Search
CPC . G06T 2207/30236; G06T 2207/20081; G06T 7/11; G06T 7/194
See application file for complete search history.

(56) References Cited

U.S. PATENT DOCUMENTS

| 9,105,104 | B2 * | 8/2015 | Nishino | .................. G06T 7/143 |
| 9,767,565 | B2 * | 9/2017 | Estrada | ................ G06K 9/6256 |
| 10,062,006 | B2 * | 8/2018 | Hong | ............... G08B 13/19602 |

(Continued)

FOREIGN PATENT DOCUMENTS

| CN | 1738426 A | 2/2006 |
| CN | 101017573 A | 8/2007 |

(Continued)

OTHER PUBLICATIONS

Aksoy, Y. "Unmixing Based Soft Color Segmentation for Image Manipulation" Disney Research Zurich ACM Transactions on Graphics vol. 36 Issue 4 Aug. 2017 Article No. 61c. pp. 1-19.*

(Continued)

*Primary Examiner* — Mia M Thomas
(74) *Attorney, Agent, or Firm* — Compass IP Law PC

(57) ABSTRACT

An embodiment of a semiconductor package apparatus may include technology to pre-process an image to simplify a background of the image, and perform object detection on the pre-processed image with the simplified background. For example, an embodiment of a semiconductor package may include technology to pre-process an image to subtract the background from the image and perform object detection on the pre-processed image with the background subtracted. Other embodiments are disclosed and claimed.

23 Claims, 12 Drawing Sheets

(56) References Cited

U.S. PATENT DOCUMENTS

| | | | |
|---|---|---|---|
| 10,186,087 B2* | 1/2019 | Davis | G06T 7/70 |
| 10,991,093 B2* | 4/2021 | Do | G06V 10/82 |
| 2009/0167857 A1* | 7/2009 | Matsuda | G07C 9/00 348/143 |
| 2011/0026814 A1* | 2/2011 | Nuuja | H04N 1/41 382/164 |
| 2011/0069155 A1* | 3/2011 | Cho | G06T 7/254 348/47 |
| 2014/0071251 A1* | 3/2014 | Nakamura | G06F 3/03545 348/51 |
| 2015/0063708 A1* | 3/2015 | Sripadarao | G06K 9/00228 382/199 |
| 2015/0339831 A1* | 11/2015 | Bobbitt | G06K 9/00771 382/107 |
| 2016/0104290 A1* | 4/2016 | Patnaik | G06T 7/12 382/173 |
| 2016/0117840 A1* | 4/2016 | Yamamoto | G06K 9/00342 382/103 |
| 2016/0162758 A1* | 6/2016 | Prest | G06V 10/464 382/159 |
| 2016/0253579 A1* | 9/2016 | Bamba | G06K 9/00771 382/103 |
| 2016/0292142 A1* | 10/2016 | Kim | G06T 11/001 |
| 2016/0292904 A1* | 10/2016 | Kim | G06T 13/80 |
| 2017/0301109 A1* | 10/2017 | Chan | G06T 7/73 |
| 2017/0316575 A1* | 11/2017 | Adachi | G06T 7/254 |
| 2018/0043229 A1* | 2/2018 | Stemle | G06T 7/20 |
| 2018/0203123 A1* | 7/2018 | Masuda | G06T 7/194 |
| 2018/0253865 A1* | 9/2018 | Price | G06N 3/088 |
| 2019/0087965 A1* | 3/2019 | Datta | A61B 5/1116 |
| 2019/0096125 A1* | 3/2019 | Schulter | G05D 1/0088 |
| 2019/0156154 A1* | 5/2019 | Tu | G06N 3/0454 |
| 2019/0325263 A1* | 10/2019 | Kellerman | G06T 1/20 |
| 2019/0332894 A1* | 10/2019 | Yang | G06V 20/56 |
| 2019/0354772 A1* | 11/2019 | Tasli | G06K 9/4623 |
| 2019/0377944 A1* | 12/2019 | Chen | G06T 7/11 |
| 2019/0377972 A1* | 12/2019 | Liu | G06K 9/6254 |
| 2020/0021733 A1* | 1/2020 | Liu | H04N 5/23219 |
| 2020/0034627 A1* | 1/2020 | Zhu | G06K 9/6277 |
| 2020/0045243 A1* | 2/2020 | Aramaki | H04N 5/272 |
| 2020/0151888 A1* | 5/2020 | Chen | G06T 7/38 |
| 2020/0261162 A1* | 8/2020 | Woods | A61B 90/37 |
| 2020/0394848 A1* | 12/2020 | Choudhary | G06T 7/50 |
| 2021/0031507 A1* | 2/2021 | Haik | G06T 7/001 |
| 2021/0035533 A1* | 2/2021 | Tanaka | G06T 7/70 |
| 2021/0209388 A1* | 7/2021 | Ciftci | G06V 40/40 |
| 2021/0209752 A1* | 7/2021 | Tenney | G06T 7/0012 |
| 2021/0248812 A1* | 8/2021 | Kuang | G06T 15/205 |

FOREIGN PATENT DOCUMENTS

| | | | | |
|---|---|---|---|---|
| CN | 101916447 A | | 12/2010 | |
| CN | 107403452 A | | 11/2017 | |
| WO | WO-2015022020 A1 * | 2/2015 | | G06K 9/4676 |

OTHER PUBLICATIONS

International Search Report and Written Opinion for International Patent Application No. PCT/CN2018/077217, dated Nov. 21, 2018, 9 pages.

"SSD detection for KITTI", github.com/manutdzou/KITTI_SSD, Feb. 7, 2018, 2 pages.

"The KITTI Vision Benchmark Suite", A project of Karlsruhe Institute of Technology and Toyota Technological Institute at Chicago, 2018, 4 pages.

Wei Liu et al., "SSD: Single Shot MultiBox Detector", Computer Vision—European Conference on Computer Vision 2016, Dec. 29, 2016, 17 pages.

"Open CV", opencv.org, 2018, 2 pages.

Joseph Redmon, Ali Farhadi, "YOLO: Real-Time Object Detection", 2016, 7 pages.

Wei Liu et al., "SSD: Single Shot MultiBox Detector", 99 pages.

Wei Liu et al., "SSD: Single Shot MultiBox Detector", github.com/weiliu89/caffe/tree/ssd, Feb. 7, 2018, 4 pages.

Mark Everingham et al., "The PASCAL Visual Object Classes Challenge: A Retrospective", International Journal of Computer Vision, Jun. 25, 2014, p. 98-136, 111, Springer Science+Business Media, New York.

* cited by examiner

OBJECT DETECTION WITH MODIFIED IMAGE BACKGROUND

CROSS REFERENCE TO RELATED APPLICATIONS

This application is a U.S. National Phase Patent Application which claims benefit to International Patent Application No. PCT/CN2018/077217 filed on Feb. 26, 2018.

TECHNICAL FIELD

Embodiments generally relate to machine vision systems. More particularly, embodiments relate to object detection with image background subtracted.

BACKGROUND

Some machine vision applications may use machine learning and/or neural network models to perform object detection and/or image classification. For example, various convolution neural network (CNN) models such as regional CNN (R-CNN), Fast R-CNN, and/or Faster R-CNN models may be deployed in an image classification system. Some image classification systems may include a you-only-look-once (YOLO) model and/or a single shot detector (SSD) model for object detection.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
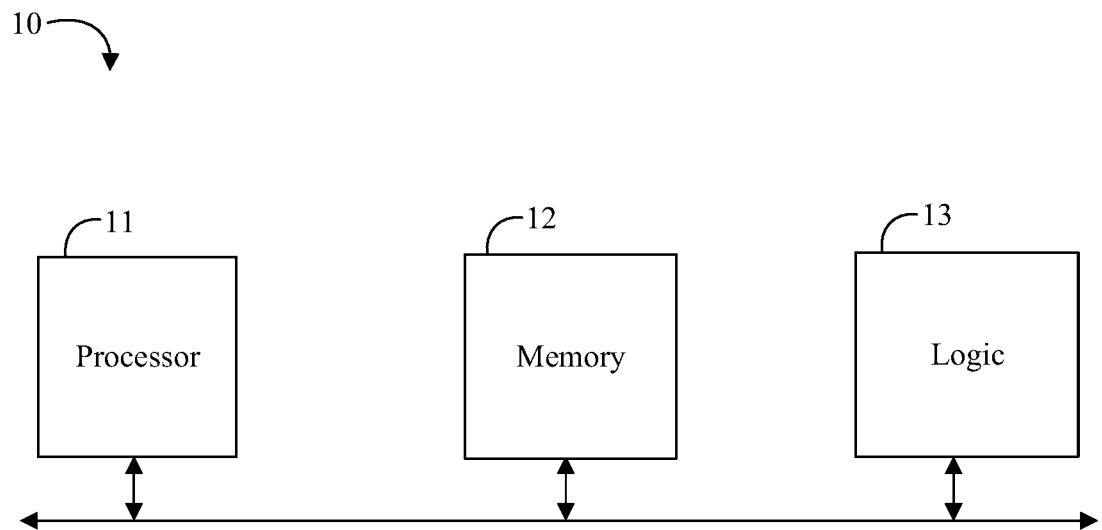
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to pre-process an image to simplify a background of the image, and perform object detection on the pre-processed image with the simplified background. In some embodiments, the logic 13 may be configured to pre-process the image to subtract the background from the image, and perform object detection on the pre-processed image with the background subtracted. In some embodiments, the logic 13 may additionally or alternatively be configured to pre-process the image to split the image into a foreground image with the background subtracted and a background image, perform object detection on both the foreground image and the background image, and combine results of the object detection on the foreground with results of the object detection on the background. For example, the logic 13 may also be configured to determine object occlusion for the background image based on two or more image frames, and fill in the background image based on the determined object occlusion. In some embodiments, the logic 13 may additionally or alternatively be configured to perform object detection on the foreground image with a first model, and perform object detection on the background image with a second model which is different from the first model. For example, the logic 13 may be configured to perform the object detection on the pre-processed image with a SSD model. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, pre-processing the image to simplify the background of the image, performing object detection on the simplified image, etc.).

Figure 2:
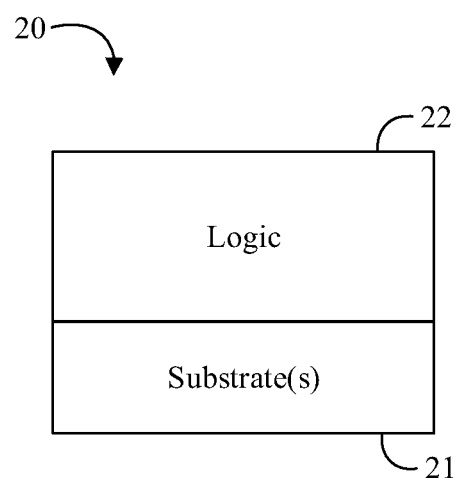
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to pre-process an image to simplify a background of the image, and perform object detection on the pre-processed image with the simplified background. In some embodiments, the logic 22 may be configured to pre-process the image to subtract the background from the image, and perform object detection on the pre-processed image with the background subtracted. In some embodiments, the logic 22 may additionally or alternatively be configured to pre-process the image to split the image into a foreground image with the background subtracted and a background image, perform object detection on both the foreground image and the background image, and combine results of the object detection on the foreground with results of the object detection on the background. For example, the logic 22 may also be configured to determine object occlusion for the background image based on two or more image frames, and fill in the background image based on the determined object occlusion. In some embodiments, the logic 22 may additionally or alternatively be configured to perform object detection on the foreground image with a first model (e.g., trained on background subtracted images), and perform object detection on the background image with a second model (e.g., trained on complex background images) which is different from the first model. For example, the logic 22 may be configured to perform the object detection on the pre-processed image with a SSD model. In some embodiments, the logic 22 coupled to the one or more substrates 21 includes transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 24 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
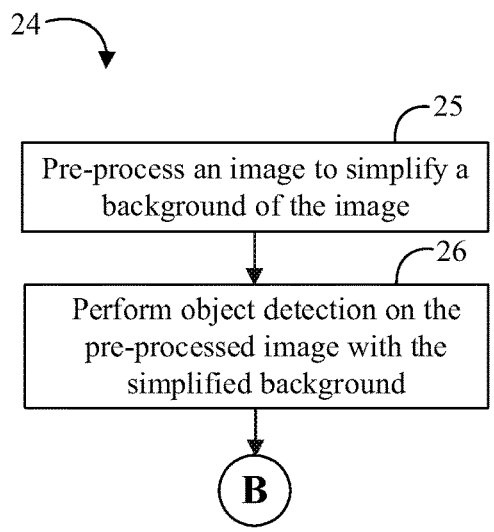
FIGS. 3A to 3C are flowcharts of an example of a method of detecting an object in an image according to an embodiment.
Figure 3B:
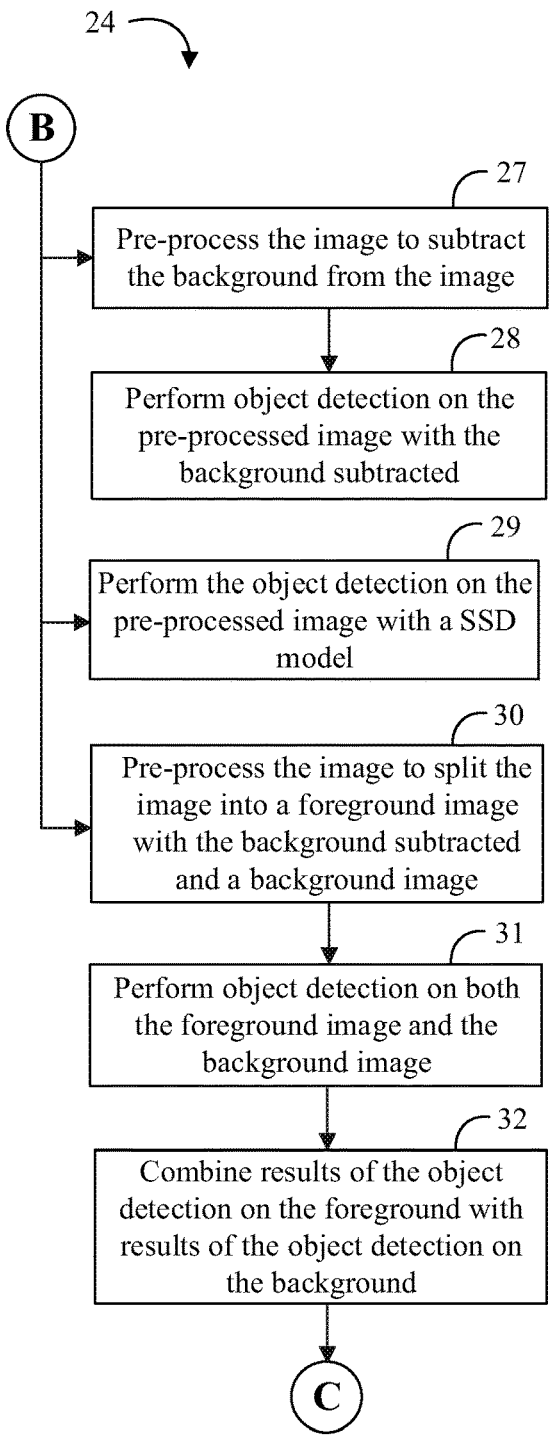
Figure 3C:
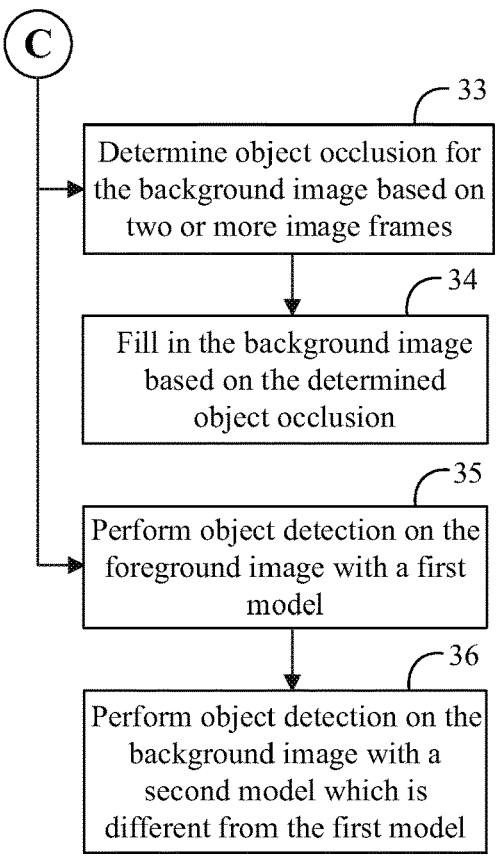

Turning now to FIGS. 3A to 3C, an embodiment of a method 24 of detecting an object in an image may include pre-processing an image to simplify a background of the image at block 25, and performing object detection on the pre-processed image with the simplified background at block 26. Some embodiments of the method 24 may include pre-processing the image to subtract the background from the image at block 27, and performing object detection on the pre-processed image with the background subtracted at block 28. For example, the method 24 may include performing the object detection on the pre-processed image with a SSD model at block 29 (e.g., or with any suitable CNN model). Some embodiments of the method 24 may additionally or alternatively include pre-processing the image to split the image into a foreground image with the background subtracted and a background image at block 30, performing object detection on both the foreground image and the background image at block 31, and combining results of the object detection on the foreground with results of the object detection on the background at block 32. For example, the method 24 may also include determining object occlusion for the background image based on two or more image frames at block 33, and filling in the background image based on the determined object occlusion at block 34. Some embodiments of the method 24 may include performing object detection on the foreground image with a first model at block 35, and performing object detection on the background image with a second model which is different from the first model at block 36.

Embodiments of the method 24 may be implemented in a system, apparatus, computer, device, etc., for example, such as those described herein. More particularly, hardware implementations of the method 24 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 24 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 24 may be implemented on a computer readable medium as described in connection with Examples 20 to 25 below. Embodiments or portions of the method 24 may be implemented in firmware, applications (e.g., through an application programming interface (API)), or driver software running on an operating system (OS).

Figure 4:
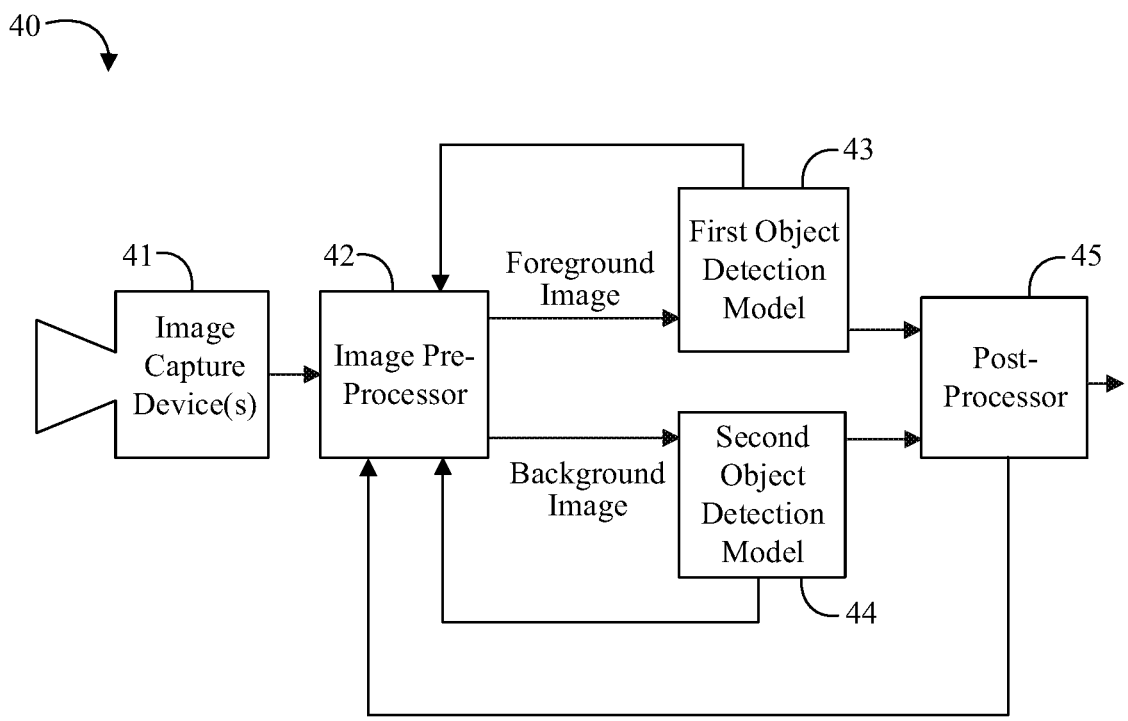
FIG. 4 is a block diagram of an example of a machine vision apparatus according to an embodiment.

Turning now to FIG. 4, an embodiment of a machine vision apparatus 40 may include one or more image capture device(s) 41, an image pre-processor 42, a first object detection model 43, a second object detection model 44, and a post-processor 45. The image capture devices 41 may include still cameras, video cameras, etc., to capture images (e.g., image frames, image data, etc.). The image pre-processor 42 may pre-process the images to split the images into foreground images and background images (e.g., as described in more detail below). The foreground images may be provided to the first object detection model 43, while the background images may be provided to the second object detection model 44. Results from both the first object detection model 43 and the second object detection model 44 may be provided to the post-processor 45, which may combine the results to provide an output for the machine vision apparatus 40. Information from the first object detection model 43, the second object detection model 44, and/or the post-processor 45 may be fed back to the image pre-processor 42 to refine the foreground and/or background images.

In some embodiments, the image pre-processor 42 may simplify the background of the images to provide the foreground images. For example, the image-pre-processor 42 may subtract the background image from the images to provide the foreground images. The first object detection model 43 may then perform object detection on the foreground image with the background simplified or subtracted. For example, the pre-processor 42 may also be configured to determine object occlusion for the background image based on two or more image frames (e.g., consecutive frames of video images), and fill in the background image based on the determined object occlusion. After several frames, a more complete and/or accurate background image may be developed. Subtracting the developed background image from the incoming images may provide more complete/accurate foreground images. The second object detection model 44 may be different from the first object detection model 43. For example, the first object detection model 43 may be trained from background subtracted images while the second object detection model 44 may be trained from complex background images. Either or both of the models 43, 44 may include a SSD model.

Embodiments of the image capture device(s) 41, the image pre-processor 42, the first object detection model 43, second object detection model 44, the post-processor 45, and other components of the machine vision apparatus 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide technology for background subtracted object detection. For autonomous vehicles, smart video surveillance, facial detection, people counting applications, etc., fast and accurate object detection systems may be an important part of those devices/applications. An object detection system may involve not only recognizing and classifying every object in an image, but also localizing each object by drawing an appropriate bounding box around the localized object. Accordingly, in some applications object detection may involve more complexity than some computer vision systems which provide only image classification.

Some CNN models (e.g., Faster-RCNN+Resnet101) may provide good accuracy, but may be too slow for some real-time object detection applications (e.g., particularly for mobile applications which may include limited compute and/or memory resources), Another problem in some deep-learning object detection applications may involve accuracy across different environments. For example, a trained model may not work well if the environment is changed too much from the training environment. For example, if a model is trained in a city environment and then inferenced in a desert environment, the accuracy may decrease dramatically. Some training accuracy issues may be addressed by using a larger input and more complex CNN model to increase mean average precision (mAP) scores, and/or to increase the size of the training set. A more complex model, however, may not be well-suited to some applications (e.g., resource constrained applications), and training too many pictures may extend training time and make it more difficult to achieve convergence. Collecting enough training images to cover all possible environments may be impractical or impossible.

The MICROSOFT Common Objects in Context (MSCOCO) dataset may be considered a large collection of training images for many classes which covers many environments. Without being limited to theory of operation, detecting smaller objects from images with more complex backgrounds in the MSCOCO dataset may statistically show lower accuracy with some object detection models. Similarly, when an environment in a test image is substantially different from the environments in the training images, the accuracy may be reduced because the images are too different. Some embodiments may simplify or subtract the background image from the image provided to the object detection model, advantageously increasing the object detection accuracy for most or all environments.

Figure 5:
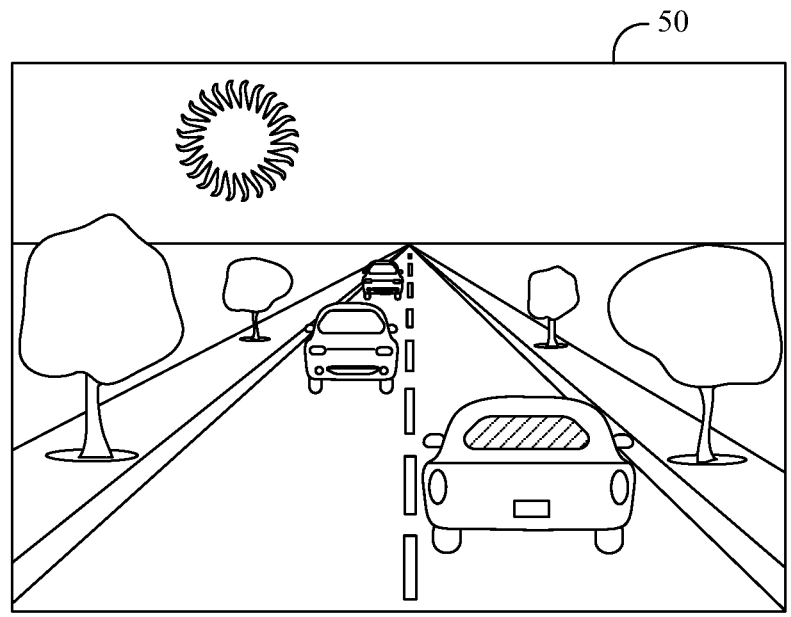
FIG. 5 is an illustrative representation of an example of a digital image according to an embodiment.
Figure 6:
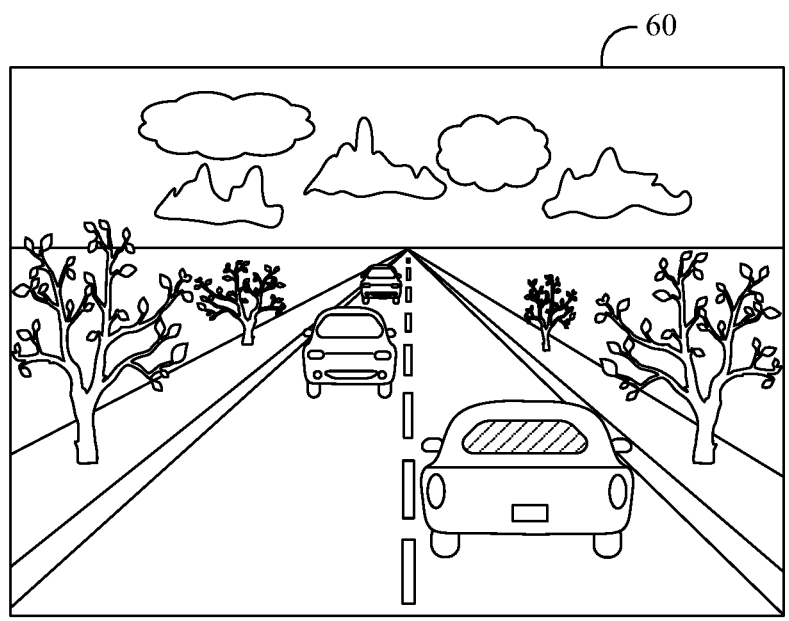
FIG. 6 is an illustrative representation of another example of a digital image according to an embodiment.

Turning now to FIGS. 5 and 6, a first image 50 may include a road scene with vehicles in a spring or summer environment (e.g., where the sun is out, the trees are green, the sky is blue, etc.). A second image 60 may include a similar road scene with vehicles in a fall or winter environment (e.g., cloudy or overcast with no sun, the trees are bare, the sky is grey, etc.). Another environment (not shown) may include a similar road scene during or after a snow fall where the background may be mostly white. In some other machine vision systems, the object detection model (e.g., Faster R-CNN, SSD, etc.) may calculate a box feature map which may include some background images and may not accurately detect some objects when the background changes (e.g., because the two images are too different from each other and/or training images).

Figure 7:
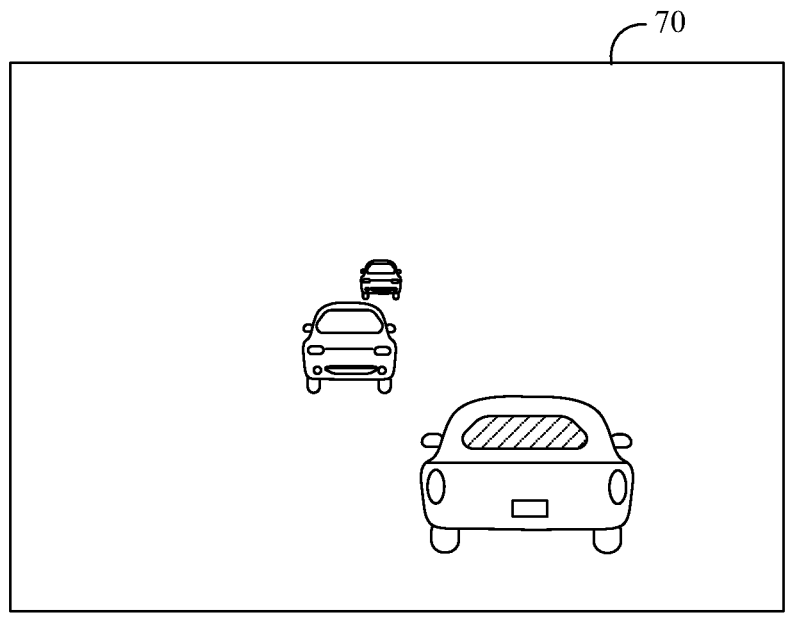
FIG. 7 is an illustrative representation of an example of a digital image with the background subtracted according to an embodiment.
Figure 8:
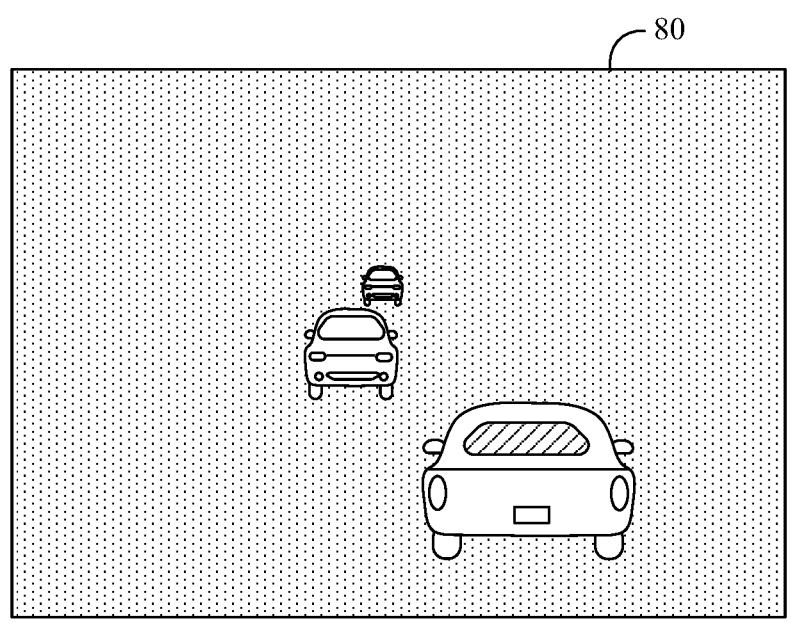
FIG. 8 is an illustrative representation of another example of a digital image with the background subtracted according to an embodiment.

Turning now to FIGS. 7 and 8, some embodiments may subtract the background from the image 50 to provide a foreground image. In some embodiments, the background may be made blank (e.g., deleted) such that the foreground image 70 may include only the vehicles and may improve the accuracy of an object detection model (e.g., particularly where the model is trained with images which also have their backgrounds deleted). In some embodiments, the background may be filled in with a uniform color (e.g., gray) such that the such that the foreground image 80 may include only the vehicles on a uniform color background. Setting the background to a uniform color may improve the accuracy of an object detection model (e.g., particularly where the model is trained with images which also have their backgrounds set to the same uniform color). Similarly, some embodiments may subtract the background from the image 60 to provide either the foreground image 70 or the foreground image 80 with the background subtracted. With the background subtracted, the foreground images 70 and 80 may be much more similar to each other and/or to suitable training images (e.g., with their backgrounds similarly subtracted). With the background subtracted, some embodiments may advantageously reduce the influence that the environment may have on subsequent object detection models. Accordingly, object detection models may more accurately detect the objects in the images, even with less complex models and/or less compute/memory resources.

Figure 9:
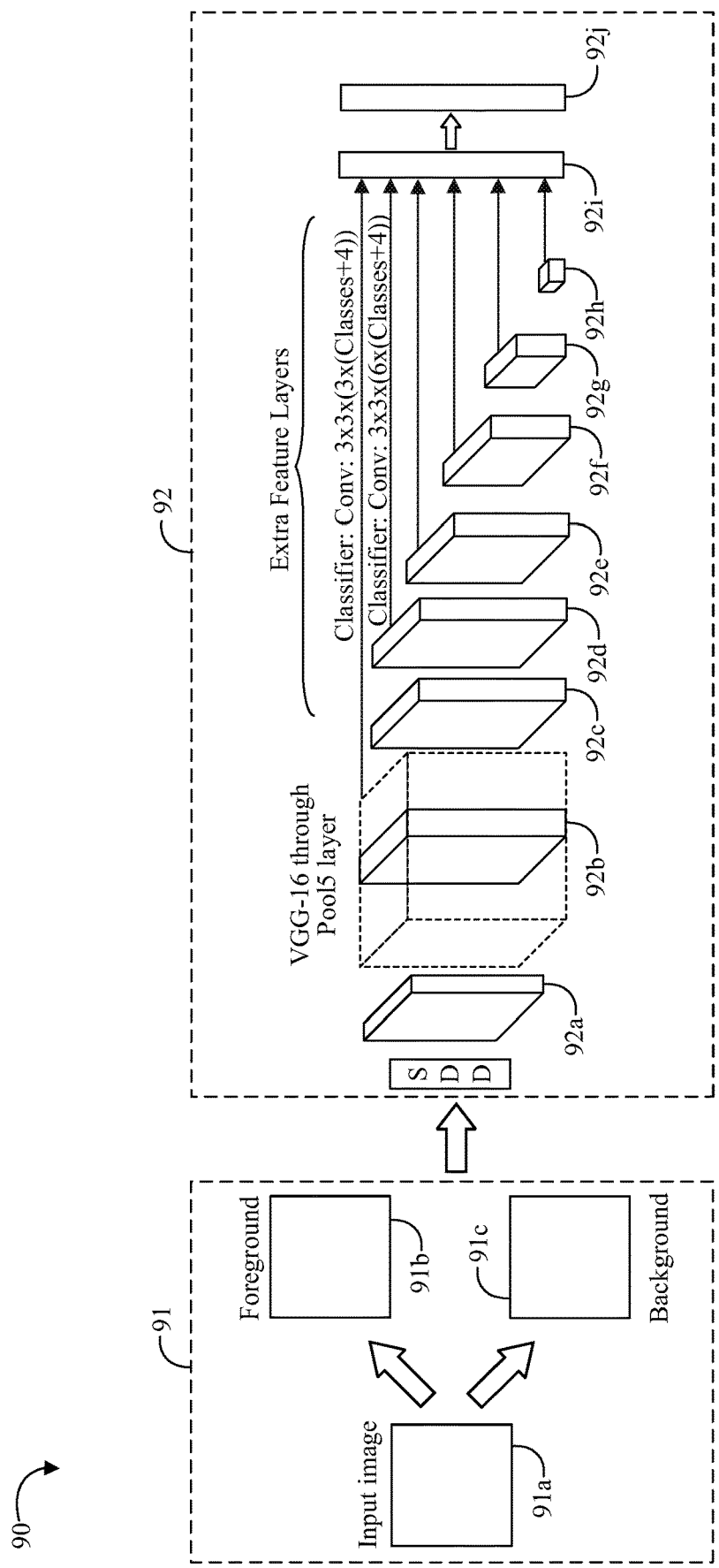
FIG. 9 is a block diagram of another example of a machine vision apparatus according to an embodiment.

Turning now to FIG. 9, a machine vision apparatus 90 may include an image pre-processor 91 communicatively coupled to a trained object detection model 92. The image pre-processor may include any suitable technology to segment an input image 91a into a foreground image 91b and a background image 91c (e.g., which may be done by a fixed camera). Any suitable technology may be utilized to split the input image 91a into the foreground image 91b and the background image 91c. The object detection model 92 may include technology to perform object detection for both the background images and the foreground images (e.g., using a different model), and combine the results. Any suitable technology may be utilized for the object detection model. For example, a SSD model may include several layers including a 300×300×3 input image layer 92a, followed by a 38×38×512 visual geometry group (VGG)-16 through pool5 layer 92b (Conv4_3), followed by a 19×9×024 convolutional layer 92c (Conv6 (FC6)), followed by a 19×19× 1024 convolutional layer 92d (Conv7 (FC7)), followed by a 10×10×512 convolutional layer 92e (Conv8_2), followed by a 5×5×256 convolutional layer 92f (Conv9_2), followed by a 3×3×256 convolutional layer 92g (Conv10_2), and followed by a 3×256 average global pooling layer 92h (Pool1). Outputs of the convolutional layers 92b-h may be provided to a detections block 92i, which may include 7308 detections per class. An output of the detections block 92i may be provided to a non-maximum suppression block 92j.

In some embodiments, the final result may provide high accuracy, avoiding background occlusion issues and/or changing environment problems. In some embodiments, high accuracy may be a key performance indicator for object detection. By removing the background through pre-processing, some embodiments may improve the mAP score (e.g., >5% improvement) and may provide SSD detection accuracy which may be higher than Faster-RCNN. After the background is removed, some object detection models may provide the same accuracy in most or all environments. In some embodiments, background object detection and foreground object detection may be done with no mutual influence, and background object occlusion may be avoided.

Figure 10:
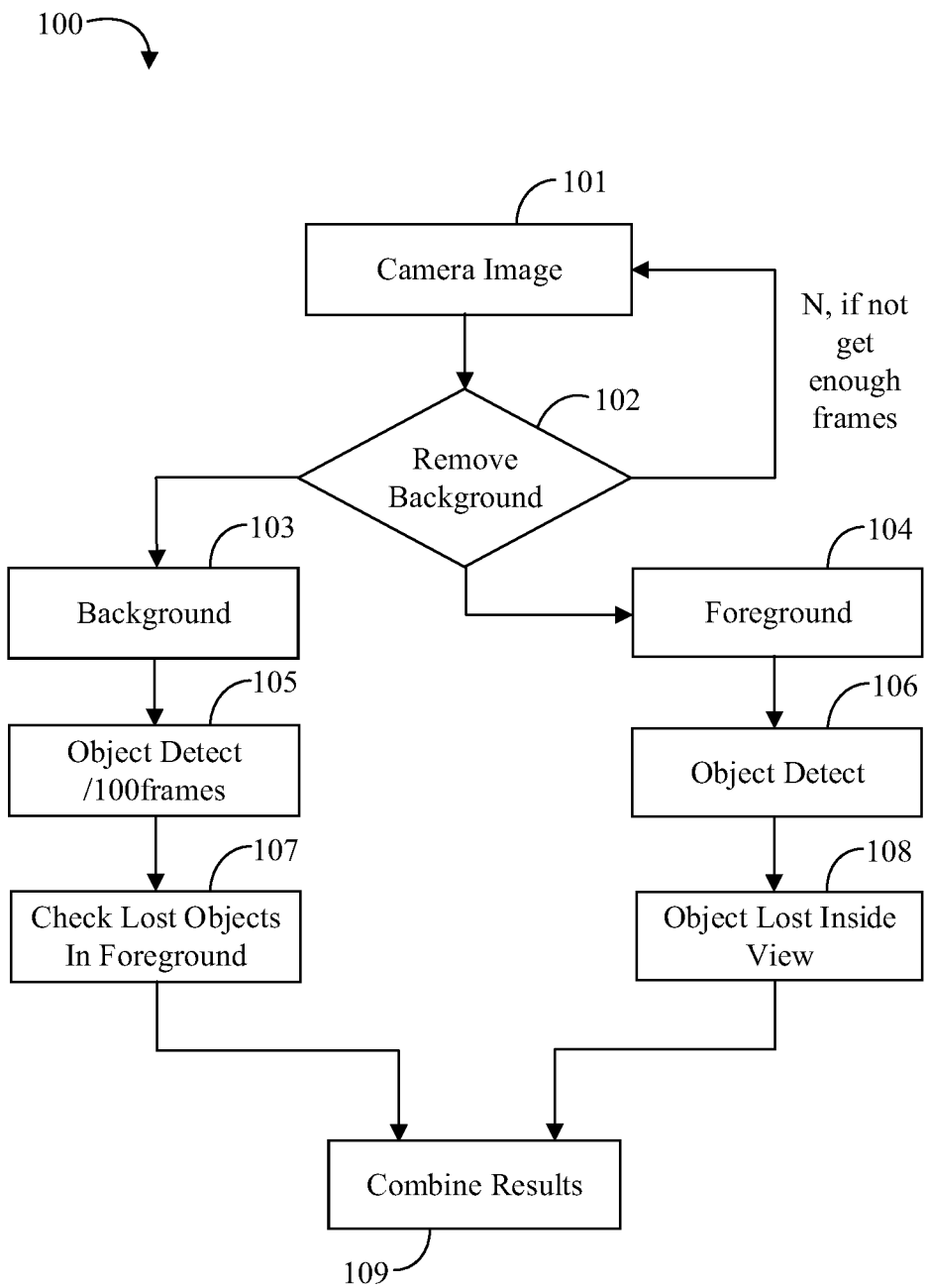
FIG. 10 is a flowchart of another example of a method of detecting objects in an image according to an embodiment.

Turning now to FIG. 10, an embodiment of a method 100 of detecting objects in an image may include acquiring camera images at block 101 (e.g., N video frames) and removing the background from an image at block 102. If there are not enough frames to isolate the background, the method 100 may return to block 101 to acquire more camera images. Otherwise, after removing the background at block 102, a background image may be available at block 103 and a foreground image may be available at block 104. The method 100 may include performing object detection at a relatively slow rate at block 105 (e.g., once per every 100 frames), and performing object detection at a relatively faster rate at block 106 (e.g., every frame). The method 100 may then include checking for object occlusion on the background at block 107 (e.g., checking lost objects in the foreground), and checking for object occlusion on the foreground at block 108 (e.g., objects lost inside the view). The method 100 may then include combining the results at block 109 (e.g., reporting all the objects detected in both the foreground and the background).

In some embodiments, the background remove model in the background subtracted object detection may split the input image into two channels (e.g., foreground and background). For example, an OpenCV (https://opencv.org) function called BackgroundSubtractorMOG may maintain a model of a background image and any pixel which does not fit the model may be considered to be a foreground pixel. Alternatively, simple frame subtraction may be utilized to subtract the background. The resulting binary image may include some noise. In some embodiments, a tiny deep-learning object detection in the binary image may reduce or remove the noise (e.g., YOLO2-tiny may provide suitable noise reduction). Some embodiments may additionally or alternatively utilize the OpenCV function findContours to find the white large objects.

Figure 11A:
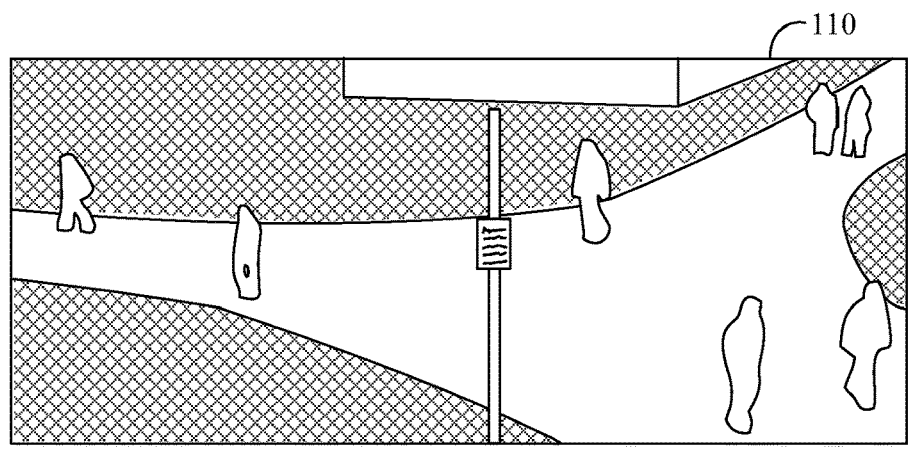
FIGS. 11A to 11C are illustrative representations of examples of a digital input image, a digital foreground image, and a digital background image, respectively, according to embodiments.
Figure 11B:
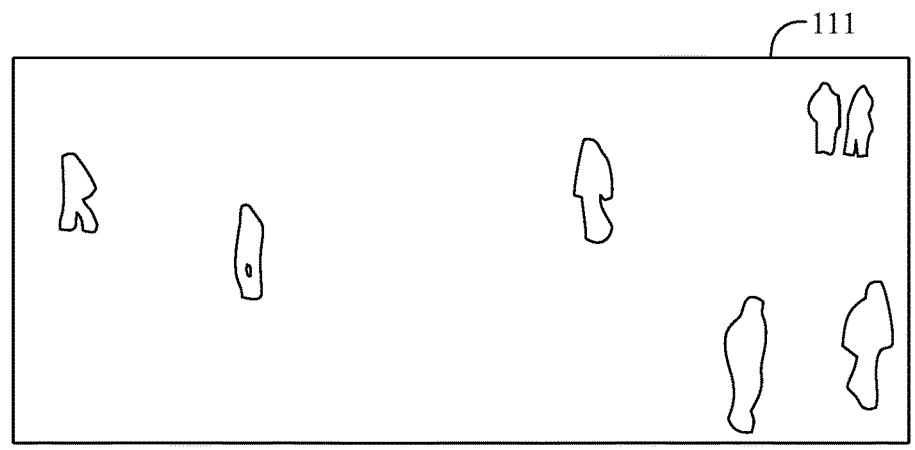
Figure 11C:
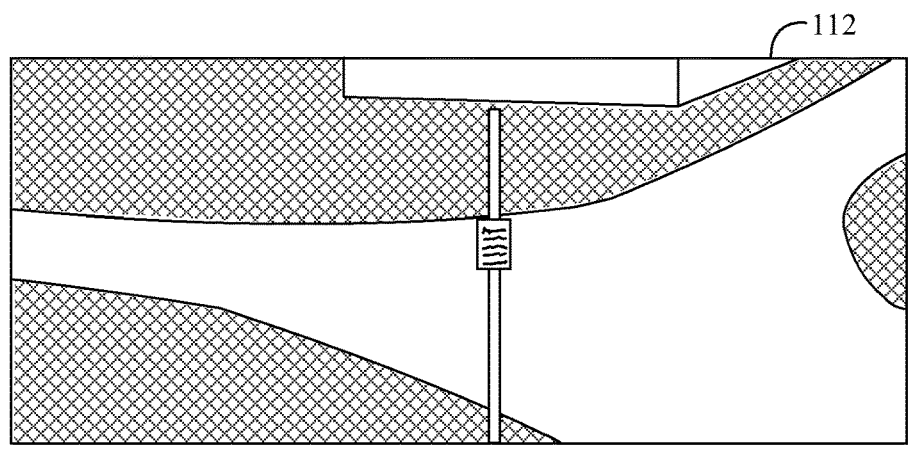

Turning now to FIGS. 11A to 11C, some embodiments may segment an illustrative input image 110 into a foreground image 111 and a background image 112. The background image 112 may be subtracted from the input image 110 with the background image pixels being set to a uniform color (e.g., gray) to provide the foreground image 111. For example, the corresponding object detection model may be trained with training images having uniform color backgrounds that are the same color as set by the image pre-processor for the foreground image 111. An initial background image may be formed after several frames, while the whole background image may be formed after some time (e.g., about 1 to 5 minutes depending on the amount of motion in the scene). For example, initially the people in the input image 110 may occlude portions of the background image 112, and the occluded portions may be blank in the background image 112 (e.g., or may be estimated/filled in based on neighboring pixels in the background image 112). As the people/objects move in the scene, the occluded portions may eventually be filled by actual background images to provide the complete background image 112.

After several frames (e.g., after an initial background image is available), object detection may begin for the foreground images 111 (e.g., where the background may be filled by gray). The model may be trained from foreground data. Advantageously, the model may not be affected by changing the background environment. In some situations, a foreground object may disappear in the view (e.g., if the foreground object stops, remains still, or becomes blocked by other foreground objects). In some embodiments, the last detection box may be kept, marked as background, and later checked in the background image.

Figure 12:
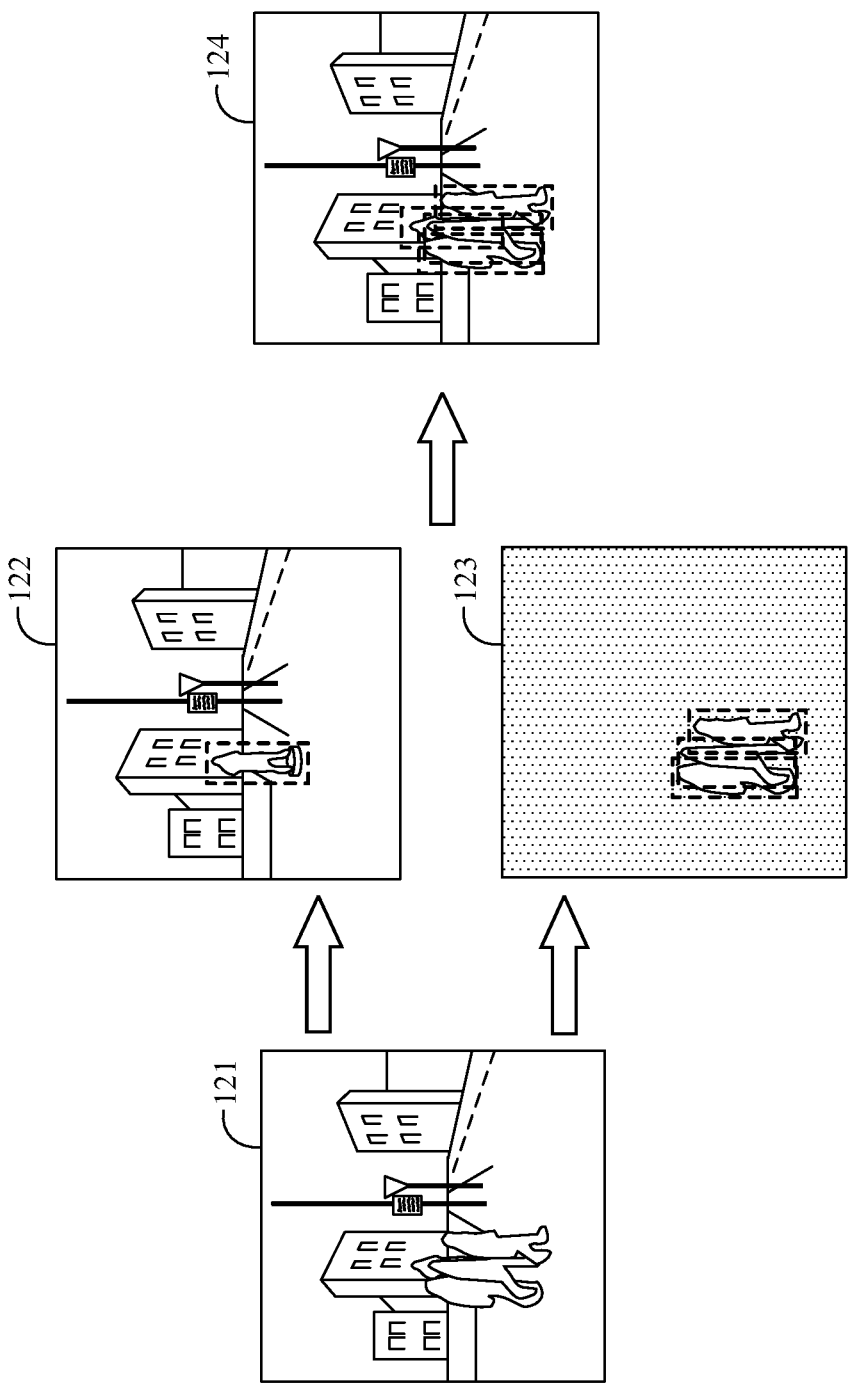
FIG. 12 is an illustrative diagram of a process flow for a machine vision apparatus according to an embodiment.

Turning now to FIG. 12, an embodiment of a process flow 120 for a machine vision apparatus may start with an input image 121. The machine vision apparatus may next segment the input image into a background image 122 and foreground image 123 with the background image 122 subtracted (e.g., the background pixels may be set to gray pixels). The machine vision apparatus may then perform object detection on both the background image 122 and the foreground image 123. In some embodiments, the model for the background image 122 may be trained with general data while the model for the foreground image 123 may be trained with training images which have their backgrounds set to gray. The background model may detect one or more objects in the background image 122 (e.g., a statue detected in the background image 122) and may localize the background object(s), indicate a bounding box for the background object(s), and/or classify the background object(s). The foreground model may detect one or more objects in the foreground image 123 (e.g., people detected in the foreground image 123) and may localize the foreground object(s), indicate a bounding box for the foreground object(s), and/or classify the foreground object(s). The machine vision apparatus may then combine the results of both the foreground detection and the background detection to provide a final result digital image 124 which includes the localizations, bounding boxes, and classifications for all of the detected objects. In some embodiments, the background objects may be visually distinguished (e.g., or otherwise distinguished) from the foreground objects.

As noted above, after several frames or a short period of time, the whole background image 122 may be formed without any foreground objects, and in some embodiments object detection may then be performed in the background image(s) 122 (e.g., the background image 122 may be updated over time). The background model may be trained from general data, and may be affected by substantial changes in the background environment (e.g., relative to the training data). In some applications, less accuracy may be acceptable with respect to object detection in the background, because some applications may be more focused on moving objects in the foreground. As discussed herein, some embodiments may avoid problems with foreground objects blocking the background. For the foreground image 123, the environment may be set to just gray (e.g., by subtracting the background), so a changing environment may advantageously have little or no effect on the detection accuracy.

An embodiment of an object detection apparatus may utilize the VOC2007 dataset (e.g., general objects) and the KITTI dataset (e.g., small objects and for traffic) for background subtracted object detection. A suitable detector may include the VGG-SSD-300 model. The training images for the foreground model may be edited to fill the background with a gray color and RGB may be changed to YUV (e.g., to apply a Y histogram equalization which may make the images brighter). For validation purposes, test images may be edited to fill the background with a gray color (e.g., and the SSD may also subtract the mean). Some embodiments may show an improvement in the mAP score even within the datasets' existing training and test images. Some embodiments may show an even greater improvement in the mAP score when the input images have substantially different environments from those included in the training dataset.

Figure 13A:
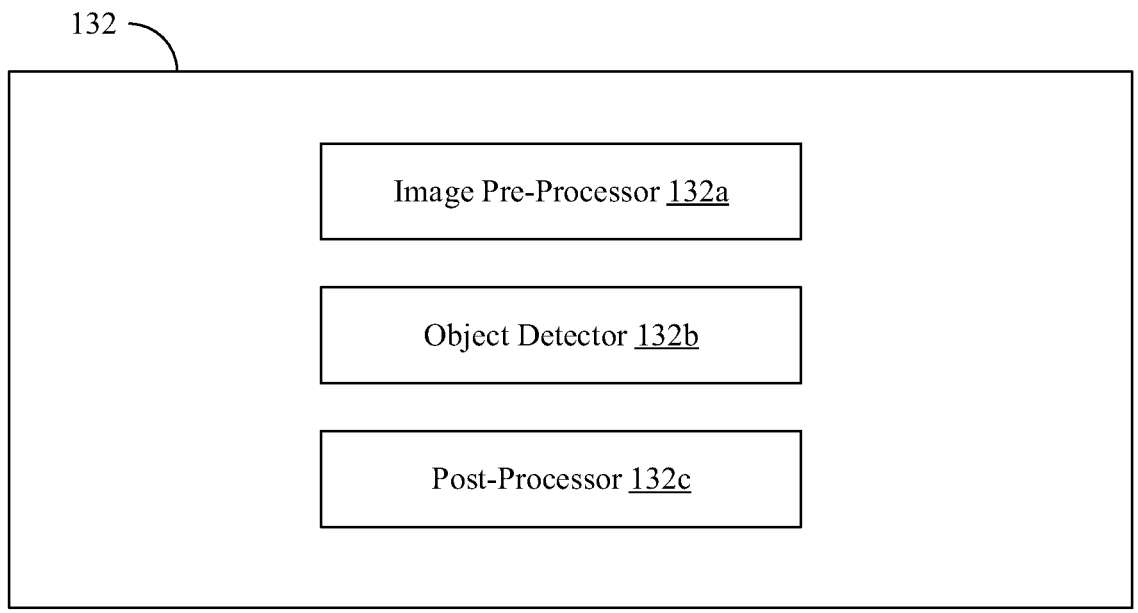
FIGS. 13A and 13B are block diagrams of examples of background subtracted object detection apparatuses according to embodiments.
Figure 13B:
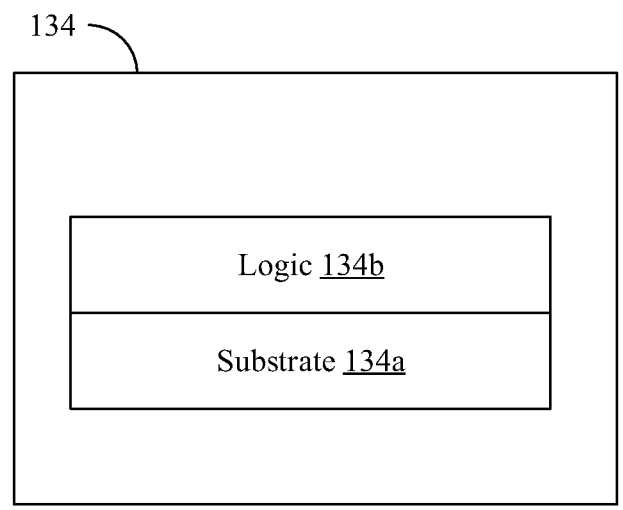

FIG. 13A shows a background subtracted object detection apparatus 132 (132a-132c) that may implement one or more aspects of the method 24 (FIGS. 3A to 3C), the method 100 (FIG. 10), and/or the process flow 120 (FIG. 12). The background subtracted object detection apparatus 132, which may include logic instructions, configurable logic, fixed-functionality hardware logic, may be readily substituted for the logic 13 (FIG. 1), the machine vision apparatus 40 (FIG. 4), and/or the machine vision apparatus 90 (FIG. 9), already discussed. An image pre-processor 132a may include technology to pre-process an image to simplify a background of the image. An object detector 132b may include technology to perform object detection on the pre-processed image with the simplified background. In some embodiments, the image pre-processor 132a may include technology to pre-process the image to subtract the background from the image, and the object detector 132b may perform object detection on the pre-processed image with the background subtracted. In some embodiments, the image pre-processor 132a may additionally or alternatively be configured to pre-process the image to split the image into a foreground image with the background subtracted and a background image, the object detector 132b perform object detection on both the foreground image and the background image, and a post-processor 132c may include technology to combine results of the object detection on the foreground with results of the object detection on the background. For example, the image pre-processor 132a, the object detector 132b, and/or the post-processor 132c may include technology to determine object occlusion for the background image based on two or more image frames, and fill in the background image based on the determined object occlusion. In some embodiments, the object detector 132b may additionally or alternatively be configured to perform object detection on the foreground image with a first model, and perform object detection on the background image with a second model which is different from the first model (e.g., trained with general data instead of background subtracted data). For example, the object detector 132b may be configured to perform the object detection on the pre-processed image with a SSD model Turning now to FIG. 13B, background subtracted object detection apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 24 (FIGS. 3A to 3C), the method 100 (FIG. 10), and/or the process flow 120 (FIG. 12). Thus, the logic 134b may pre-process an image to simplify a background of the image, and perform object detection on the pre-processed image with the simplified background. In some embodiments, the logic 134b may be configured to pre-process the image to subtract the background from the image, and perform object detection on the pre-processed image with the background subtracted. In some embodiments, the logic 134b may additionally or alternatively be configured to pre-process the image to split the image into a foreground image with the background subtracted and a background image, perform object detection on both the foreground image and the background image, and combine results of the object detection on the foreground with results of the object detection on the background. For example, the logic 134b may also be configured to determine object occlusion for the background image based on two or more image frames, and fill in the background image based on the determined object occlusion. In some embodiments, the logic 134b may additionally or alternatively be configured to perform object detection on the foreground image with a first model, and perform object detection on the background image with a second model which is different from the first model. For example, the logic 134b may be configured to perform the object detection on the pre-processed image with a SSD model. In one example, the apparatus 134 is a semiconductor die, chip and/or package.

Figure 14:
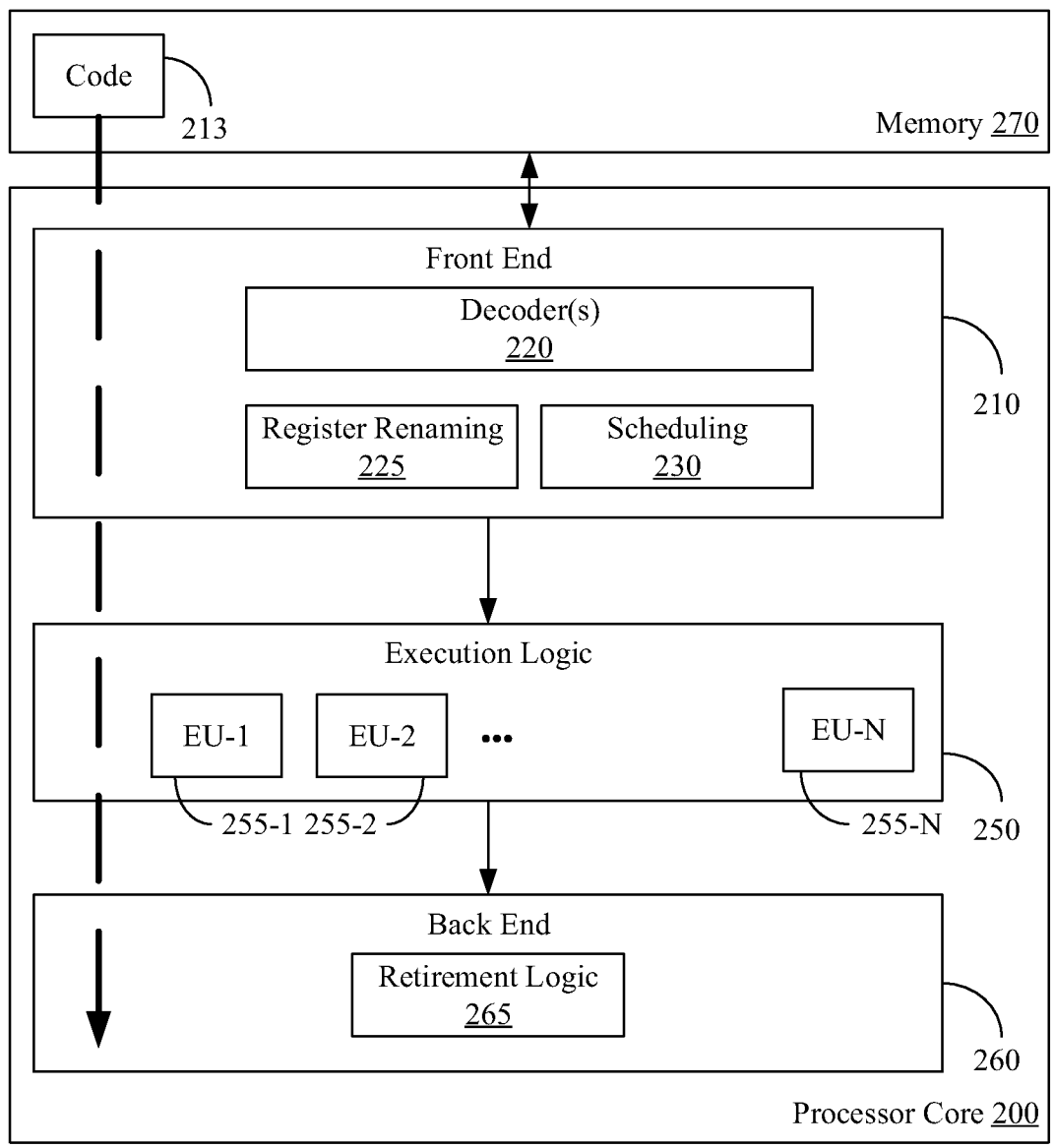
FIG. 14 is a block diagram of an example of a processor according to an embodiment.

FIG. 14 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 14, a processing element may alternatively include more than one of the processor core 200 illustrated in FIG. 14. The processor core 200 may be a single-threaded core or, for at least one embodiment, the processor core 200 may be multithreaded in that it may include more than one hardware thread context (or "logical processor") per core.

FIG. 14 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 24 (FIGS. 3A to 3C), the method 100 (FIG. 10), and/or the process flow 120 (FIG. 12), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forns as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 14, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 15:
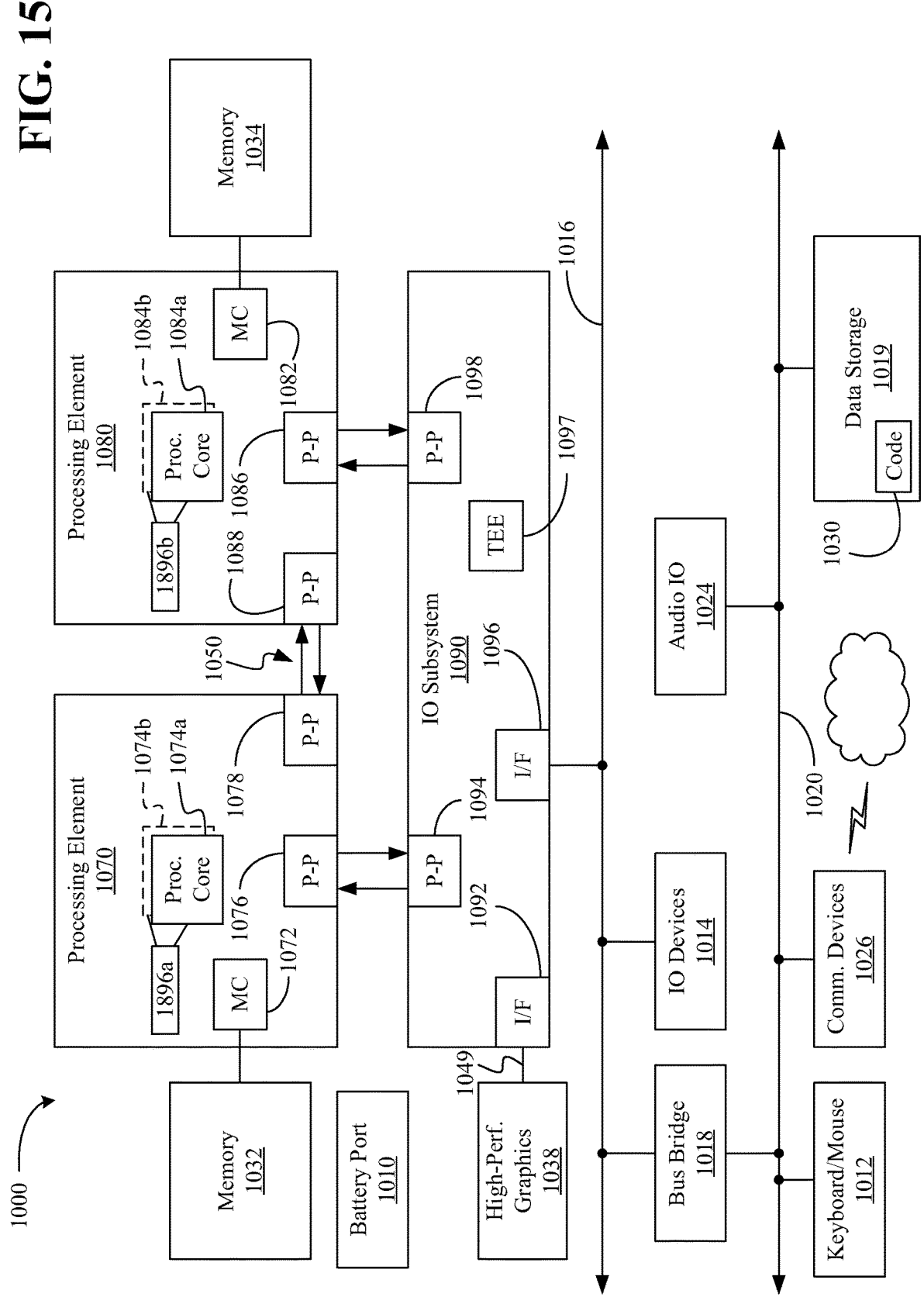
FIG. 15 is a block diagram of an example of a system according to an embodiment.

Referring now to FIG. 15, shown is a block diagram of a system 1000 embodiment in accordance with an embodiment. Shown in FIG. 15 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 15 may be implemented as a multi-drop bus rather than point-to-point interconnect.

As shown in FIG. 15, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 14.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 15, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086, respectively. As shown in FIG. 15, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 15, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 24 (FIGS. 3A to 3C), the method 100 (FIG. 10), and/or the process flow 120 (FIG. 12), already discussed, and may be similar to the code 213 (FIG. 14), already discussed. Further, an audio I/O 1024 may be coupled to second bus 1020.

Note that other embodiments are contemplated. For example, instead of the point-to-point architecture of FIG. 15, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the processor to pre-process an image to simplify a background of the image, and perform object detection on the pre-processed image with the simplified background.

Example 2 may include the system of Example 1, wherein the logic is further to pre-process the image to subtract the background from the image, and perform object detection on the pre-processed image with the background subtracted.

Example 3 may include the system of Example 2, wherein the logic is further to pre-process the image to split the image into a foreground image with the background subtracted and a background image, perform object detection on both the foreground image and the background image, and combine results of the object detection on the foreground with results of the object detection on the background.

Example 4 may include the system of Example 3, wherein the logic is further to determine object occlusion for the background image based on two or more image frames, and fill in the background image based on the determined object occlusion.

Example 5 may include the system of Example 3, wherein the logic is further to perform object detection on the foreground image with a first model, and perform object detection on the background image with a second model which is different from the first model.

Example 6 may include the system of any of Examples 1 to 5, wherein the logic is further to perform the object detection on the pre-processed image with a single shot detector model.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to pre-process an image to simplify a background of the image, and perform object detection on the pre-processed image with the simplified background.

Example 8 may include the apparatus of Example 7, wherein the logic is further to pre-process the image to subtract the background from the image, and perform object detection on the pre-processed image with the background subtracted.

Example 9 may include the apparatus of Example 8, wherein the logic is further to pre-process the image to split the image into a foreground image with the background subtracted and a background image, perform object detection on both the foreground image and the background image, and combine results of the object detection on the foreground with results of the object detection on the background.

Example 10 may include the apparatus of Example 9, wherein the logic is further to determine object occlusion for the background image based on two or more image frames, and fill in the background image based on the determined object occlusion.

Example 11 may include the apparatus of Example 9, wherein the logic is further to perform object detection on the foreground image with a first model, and perform object detection on the background image with a second model which is different from the first model.

Example 12 may include the apparatus of any of Examples 7 to 11, wherein the logic is further to perform the object detection on the pre-processed image with a single shot detector model.

Example 13 may include the apparatus of any of Examples 7 to 11, wherein the logic coupled to the one or more substrates includes transistor channel regions that are positioned within the one or more substrates.

Example 14 may include a method of detecting an object in an image, comprising pre-processing an image to simplify a background of the image, and performing object detection on the pre-processed image with the simplified background.

Example 15 may include the method of Example 14, further comprising pre-processing the image to subtract the background from the image, and performing object detection on the pre-processed image with the background subtracted.

Example 16 may include the method of Example 15, further comprising pre-processing the image to split the image into a foreground image with the background subtracted and a background image, performing object detection on both the foreground image and the background image, and combining results of the object detection on the foreground with results of the object detection on the background.

Example 17 may include the method of Example 16, further comprising determining object occlusion for the background image based on two or more image frames, and filling in the background image based on the determined object occlusion.

Example 18 may include the method of Example 16, further comprising performing object detection on the foreground image with a first model, and performing object detection on the background image with a second model which is different from the first model.

Example 19 may include the method of any of Examples 14 to 18, further comprising performing the object detection on the pre-processed image with a single shot detector model.

Example 20 may include at least one computer readable medium, comprising a set of instructions, which when executed by a computing device, cause the computing device to pre-process an image to simplify a background of the image, and perform object detection on the pre-processed image with the simplified background.

Example 21 may include the at least one computer readable medium of Example 20, comprising a further set of instructions, which when executed by the computing device, cause the computing device to pre-process the image to subtract the background from the image, and perform object detection on the pre-processed image with the background subtracted.

Example 22 may include the at least one computer readable medium of Example 21, comprising a further set of instructions, which when executed by the computing device, cause the computing device to pre-process the image to split the image into a foreground image with the background subtracted and a background image, perform object detection on both the foreground image and the background image, and combine results of the object detection on the foreground with results of the object detection on the background.

Example 23 may include the at least one computer readable medium of Example 22, comprising a further set of instructions, which when executed by the computing device, cause the computing device to determine object occlusion for the background image based on two or more image frames, and fill in the background image based on the determined object occlusion.

Example 24 may include the at least one computer readable medium of Example 22, comprising a further set of instructions, which when executed by the computing device, cause the computing device to perform object detection on the foreground image with a first model, and perform object detection on the background image with a second model which is different from the first model.

Example 25 may include the at least one computer readable medium of any of Examples 20 to 24, comprising a further set of instructions, which when executed by the computing device, cause the computing device to perform the object detection on the pre-processed image with a single shot detector model.

Example 26 may include a machine vision apparatus, comprising means for pre-processing an image to simplify a background of the image, and means for performing object detection on the pre-processed image with the simplified background.

Example 27 may include the apparatus of Example 26, further comprising means for pre-processing the image to subtract the background from the image, and means for performing object detection on the pre-processed image with the background subtracted.

Example 28 may include the apparatus of Example 27, further comprising means for pre-processing the image to split the image into a foreground image with the background subtracted and a background image, means for performing object detection on both the foreground image and the background image, and means for combining results of the object detection on the foreground with results of the object detection on the background.

Example 29 may include the apparatus of Example 28, further comprising means for determining object occlusion for the background image based on two or more image frames, and means for filling in the background image based on the determined object occlusion.

Example 30 may include the apparatus of Example 28, further comprising means for performing object detection on the foreground image with a first model, and means for performing object detection on the background image with a second model which is different from the first model.

Example 31 may include the apparatus of any of Examples 26 to 30, further comprising means for performing the object detection on the pre-processed image with a single shot detector model.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
circuitry communicatively coupled to the processor to:
process an image to modify a background of the image to a uniform color;
perform object detection on the processed image with the modified background; and
detect an object in the processed image with modified background based on a convolutional neural network.

2. The system of claim 1, further comprising:
an image processor to modify the background of the image to provide the processed image.

3. The system of claim 1, wherein the circuitry is further to:
process the image to split the image into a foreground image with the modified background and the background image;
perform object detection on both the foreground image and the background image; and
combine results of the object detection on the foreground image with results of the object detection on the background image.

4. The system of claim 3, wherein the circuitry is further to:
determine object occlusion for the background image based on two or more image frames; and
fill in the background image based on the determined object occlusion.

5. The system of claim 3, wherein the circuitry is further to:
perform object detection on the foreground image with a first model; and
perform object detection on the background image with a second model which is different from the first model.

6. The system of claim 1, wherein the circuitry is further to:
perform the object detection on the processed image with a single shot detector model.

7. A semiconductor package apparatus, comprising:
one or more substrates; and
circuitry coupled to the one or more substrates, wherein the circuitry is at least partly implemented in one or more of configurable circuitry and fixed-functionality hardware circuitry, the circuitry coupled to the one or more substrates to:
process an image to modify a background of the image to a uniform color;
perform object detection on the processed image with the modified background; and
detect an object in the processed image with modified background based on a convolutional neural network.

8. The apparatus of claim 7, wherein the circuitry comprises:
an image processor to modify the background of the image to provide the pre processed image.

9. The apparatus of claim 7, wherein the circuitry is further to:
process the image to split the image into a foreground image with the modified background and the background image;
perform object detection on both the foreground image and the background image; and
combine results of the object detection on the foreground image with results of the object detection on the background image.

10. The apparatus of claim 9, wherein the circuitry is further to:
determine object occlusion for the background image based on two or more image frames; and
fill in the background image based on the determined object occlusion.

11. The apparatus of claim 9, wherein the circuitry is further to:
perform object detection on the foreground image with a first model; and
perform object detection on the background image with a second model which is different from the first model.

12. The apparatus of claim 7, wherein the circuitry is further to:
perform the object detection on the processed image with a single shot detector model.

13. The apparatus of claim 7, wherein the circuitry coupled to the one or more substrates includes transistor channel regions that are positioned within the one or more substrates.

14. A method comprising:
processing an image to modify a background of the image to a uniform color; and
performing object detection on the processed image with the modified background; and
detecting an object in the processed image with modified background based on a convolutional neural network.

15. The method of claim 14, further comprising:
processing the image to split the image into a foreground image with the modified background and a background image;
performing object detection on both the foreground image and the background image; and
combining results of the object detection on the foreground image with results of the object detection on the background image.

16. The method of claim 15, further comprising:
determining object occlusion for the background image based on two or more image frames; and
filling in the background image based on the determined object occlusion.

17. The method of claim 15, further comprising:
performing object detection on the foreground image with a first model; and
performing object detection on the background image with a second model which is different from the first model.

18. The method of claim 14, further comprising:
performing the object detection on the processed image with a single shot detector model.

19. At least one non-transitory computer readable medium, comprising a set of instructions, which when executed by a computing device, cause the computing device to:
process an image to modify a background of the image to a uniform color;

perform object detection on the processed image with the modified background; and detect an object in the processed image with modified background based on a convolutional neural network.

20. The at least one computer readable medium of claim 19, comprising a further set of instructions, which when executed by the computing device, cause the computing device to:

process the image to split the image into a foreground image with the modified background and the background image;

perform object detection on both the foreground image and the background image; and combine results of the object detection on the foreground image with results of the object detection on the background image.

21. The at least one computer readable medium of claim 20, comprising a further set of instructions, which when executed by the computing device, cause the computing device to:

determine object occlusion for the background image based on two or more image frames; and fill in the background image based on the determined object occlusion.

22. The at least one computer readable medium of claim 20, comprising a further set of instructions, which when executed by the computing device, cause the computing device to:

perform object detection on the foreground image with a first model; and perform object detection on the background image with a second model which is different from the first model.

23. The at least one computer readable medium of claim 19, comprising a further set of instructions, which when executed by the computing device, cause the computing device to:

perform the object detection on the processed image with a single shot detector model.

* * * * *